(12) United States Patent
Uluyol et al.

(10) Patent No.: US 7,216,489 B2
(45) Date of Patent: May 15, 2007

(54) SYSTEM AND METHOD FOR LIGHTOFF DETECTION IN TURBINE ENGINES

(75) Inventors: Onder Uluyol, Fridley, MN (US); Dale Mukavetz, Chandler, AZ (US); Sunil K. Menon, Golden Valley, MN (US)

(73) Assignee: Honeywell International, Inc., Morristown, NJ (US)

( * ) Notice: Subject to any disclaimer, the term of this patent is extended or adjusted under 35 U.S.C. 154(b) by 210 days.

(21) Appl. No.: 10/855,477

(22) Filed: May 26, 2004

(65) Prior Publication Data

US 2007/0051111 A1    Mar. 8, 2007

(51) Int. Cl.
F02C 7/26    (2006.01)

(52) U.S. Cl. .............. 60/778; 60/786; 60/800

(58) Field of Classification Search .......... 60/778, 60/786, 787, 790, 800; 431/14; 701/100
See application file for complete search history.

(56) References Cited

U.S. PATENT DOCUMENTS

| | | | |
|---|---|---|---|
| 4,274,255 A | 6/1981 | Pollak | |
| 4,578,756 A | 3/1986 | Rosenbush et al. | |
| 5,107,674 A * | 4/1992 | Wibbelsman et al. | 60/778 |
| 5,123,239 A | 6/1992 | Rodgers | |
| 5,155,437 A | 10/1992 | Frus | |
| 5,748,500 A | 5/1998 | Quentin et al. | |
| 6,062,016 A | 5/2000 | Edelman | |
| 6,357,219 B1 | 3/2002 | Dudd, Jr. et al. | |
| 6,470,258 B1 | 10/2002 | Leamy et al. | |
| 6,810,677 B2 * | 11/2004 | Dewis | 60/778 |

* cited by examiner

Primary Examiner—L. J. Casaregola
(74) Attorney, Agent, or Firm—Ingrassia Fisher & Lorenz

(57) ABSTRACT

A system and method is provided for lightoff detection in a turbine engine that provides improved accuracy and consistency. The system and method use engine temperature and engine rotation speed sensor data to determine a first time interval during which the lightoff is estimated to have occurred. A peak gradient in the temperature sensor data within the first time interval and a peak gradient in the engine rotation sensor data within the first time interval are then determined. The temperature peak gradient time and the engine rotation peak gradient time are then used as boundaries to determine a narrowed time interval within the first time interval. The minimum gradient in the engine rotation sensor data in the narrowed time interval is determined, with the minimum gradient time in the engine rotation sensor data comprising an accurate estimate of lightoff time for the turbine engine.

20 Claims, 6 Drawing Sheets

SYSTEM AND METHOD FOR LIGHTOFF DETECTION IN TURBINE ENGINES

FIELD OF THE INVENTION

This invention generally relates to combustion engines, and more specifically relates to combustion system lightoff detection in turbine engines.

BACKGROUND OF THE INVENTION

Modern aircraft are increasingly complex. The complexities of these aircraft have led to an increasing need for automated fault detection systems. These fault detection systems are designed to monitor the various systems of the aircraft in an effect to detect potential faults. These systems are designed to detect these potential faults such that the potential faults can be addressed before the potential faults lead to serious system failure and possible in-flight shutdowns, take-off aborts, and delays or cancellations.

Turbine engines, including main power and auxiliary power engines are of course, a particularly critical part of the aircraft. As such, fault detection for turbine engines are an important part of an aircrafts fault detection system. One area where fault detection has been lacking is in transient conditions such as during startup. One problem with fault detection during startup has been the inability of fault detection systems to accurately and reliably determine when engine lightoff has occurred during startup. During startup of a turbine engine, a starter motor rotates the turbine engine while the combustor provides fuel that is ignited by the igniter. Engine lightoff is defined as the time when combustion has been initiated and the engine itself begins to provide torque, as opposed to being driven solely by the starter. Current methods of detecting lightoff have only been able to confirm that lightoff has been achieved after the fact. These methods have not been able to accurately determine when the lightoff actually occurred. Without an accurate determination of when engine lightoff has occurred, it is difficult to compare measurements from multiple startups of a given engine or large engine sample under varying ambient conditions and with varying component health states, and thus difficult to trend or otherwise detect faults that are or will be occurring in the turbine engine.

Thus, what is needed is an improved system and method for detecting lightoff in turbine engines.

BRIEF SUMMARY OF THE INVENTION

The present invention provides a system and method for lightoff detection in a turbine engine that provides improved accuracy and consistency. The lightoff detection system and method uses engine temperature sensor data and engine speed sensor data. For example, the lightoff detection system and method can use exhaust gas temperature (EGT) data combined with engine rotational speed (N) data to accurately determine when lightoff has occurred in a turbine engine during startup.

Specifically, the system and method use engine temperature and engine rotation speed sensor data acquired as a function of time to determine a first time interval during which the lightoff is estimated to have occurred. A peak gradient in the temperature sensor data within the first time interval and a peak gradient in the engine rotation sensor data within the first time interval are then determined. The temperature peak gradient time and the engine rotation peak gradient time are then used as boundaries to determine a narrowed time interval within the first time interval. The gradient of engine rotation sensor data is then used to accurately pinpoint the lightoff time in the narrowed time interval. Specifically, the minimum gradient in the engine rotation sensor data in the narrowed time interval is determined, with the minimum gradient time in the engine rotation sensor data comprising an accurate estimate of lightoff time for the turbine engine. The lightoff detection system and method is thus able to accurately and consistently determine when lightoff has occurred in a turbine engine. This information can be used as part of a trending system to determine when faults in the start transient regime are occurring or likely to occur. Additionally, this information can be used in real time by control systems to better control the startup and operation of the turbine engine.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The present invention provides a system and method for lightoff detection in a turbine engine that provides improved accuracy and consistency. The lightoff detection system and method uses engine temperature sensor data and engine speed sensor data. For example, the lightoff detection system and method can use exhaust gas temperature (EGT) data combined with engine rotational speed (N) data to accurately determine when lightoff has occurred in a turbine engine during startup.

Figure 1:
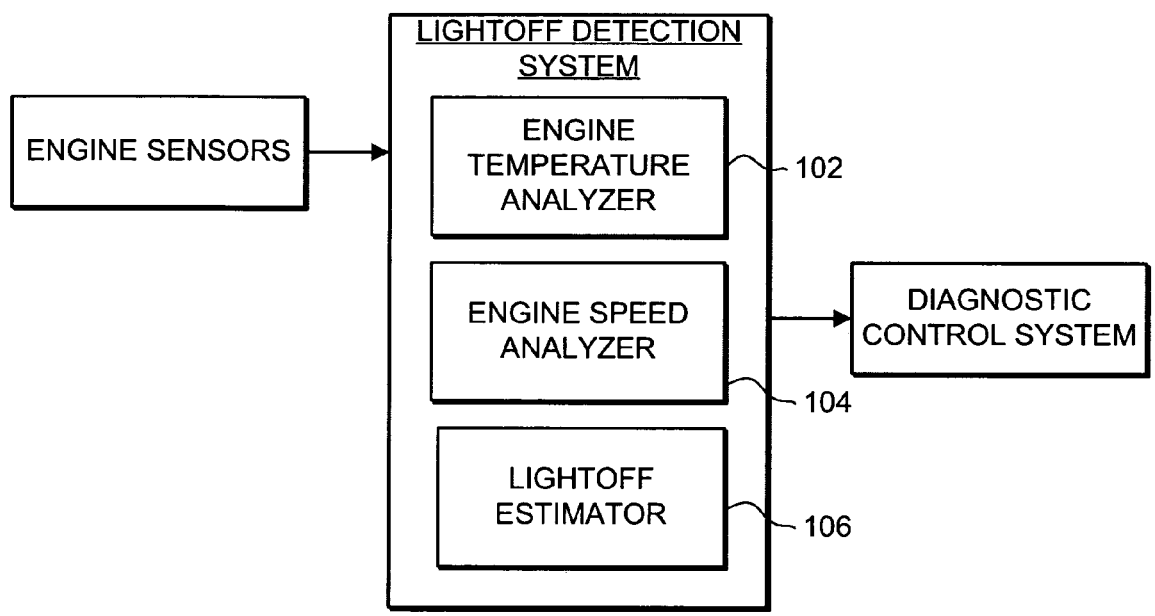
FIG. 1 is a schematic view of a lightoff detection system.

Turning now to FIG. 1, a lightoff detection system 100 that uses engine temperature sensor data and engine speed sensor data is illustrated schematically. The lightoff detection system 100 includes an engine temperature analyzer 102, an engine speed analyzer 104, and a lightoff estimator 106. The light off detection system 100 first receives the engine temperature sensor data and engine speed sensor data for the turbine engine during startup. The lightoff detection system 100 then determines an initial start time and a threshold temperature time to determine a first time interval during which the lightoff is estimated to have occurred in a turbine engine. The engine temperature analyzer 102 determines a peak gradient in the temperature sensor data within the first time interval. Likewise, the engine speed analyzer 104 determines a peak gradient in the engine rotation sensor data within the first time interval. The temperature peak gradient time and the engine rotation peak gradient time are then used as boundaries to determine a narrowed time interval within the first time interval. The gradient of engine rotation sensor data is then used to accurately pinpoint the lightoff time in the narrowed time interval. Specifically, the lightoff estimator 106 determines minimum gradient in the engine speed sensor data in the narrowed time interval is determined, with the minimum gradient time in the engine rotation sensor data comprising an accurate estimate of lightoff time for the turbine engine. The lightoff detection system 100 is thus able to accurately and consistently determine when lightoff has occurred in a turbine engine.

Figure 2:
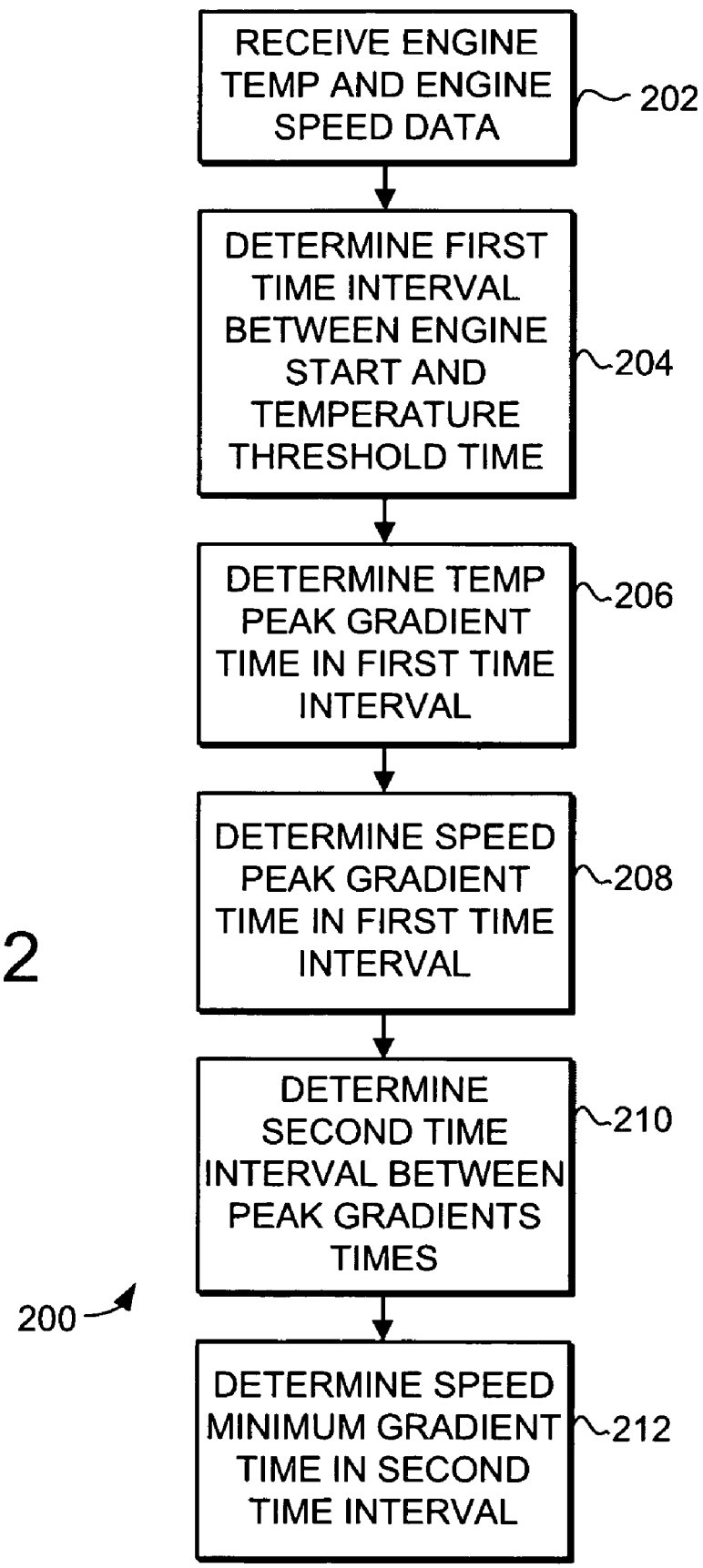
FIG. 2 is a flow diagram of a lightoff detection method.

Turning now to FIG. 2, a lightoff detection method 200 is illustrated. The method 200 uses engine temperature and engine speed sensor data to determine a first time interval during which the lightoff is estimated to have occurred. The first step 202 is to receive engine temperature and engine speed sensor data. A variety of types of engine temperature and engine speed data can be used. For example, the engine temperature data can comprise sensor data from any hot section on the turbine engine. Specifically, the engine temperature data can include exhaust gas temperature (EGT) sensor data. Likewise, the engine speed data can comprise a variety of engine rotational speed measurements, such as N1 or N2 shaft measurements within the turbine engine. In any of these cases the engine temperature and speed data is used to determine an estimate of when engine lightoff has occurred. The engine sensor data would typically be provided from an electronic control system designed to monitor the required engine parameters. This sensor data would typically monitor the engine parameters at a relatively high sampling rate, on the order of 1 Hz or higher in many applications. Many modern engines include electronic control systems that can provide the needed engine parameters for lightoff detection using method 200.

The next step 204 is to determine a first time interval between the engine start of and a threshold temperature time. This first time interval is a fist estimation of a time interval in which lightoff can be assumed to have occurred. The engine start time at the beginning of the interval can be any suitable time in the starting process. As one example, the engine start time can be the time when the starter motor begins to rotate the engine. This would typically be detected by the engine speed sensor. Of course, other suitable reference points around this time can be used instead.

Likewise, the threshold temperature time is a time when the engine reaches a threshold temperature that indicates that lightoff has occurred. Preferably, the threshold temperature used for this time is selected to assure that lightoff has always occurred before this threshold temperature is reached. However, it is also desirable not to set the threshold temperature so high as to make the time significantly later than lightoff and increase the first interval time. As one specific example, a threshold value for the exhaust gas temperature of an engine can be determined using testing and/or other analysis. In this case, the threshold value is an exhaust gas temperature value that is high enough to assure that lightoff has occurred when the exhaust gas temperature reaches this value. For example, a typical propulsion engine could use 371 degrees F. as the threshold value.

Thus, in step 204 a first time interval that is not unjustifiably large can be found in which lightoff can reasonably be assumed to have occurred. The next step 206 is to determine a temperature peak gradient time in the first time interval. The temperature peak gradient time in the first time interval is the time in the first time interval when the temperature is increasing the fastest. Stated another way, the temperature peak gradient time occurs at the time of highest slope in the temperature plot during the first time interval. A variety of mathematical techniques can be used to determine the time of the peak gradient for the temperature.

For example, a numerical gradient can be computed using a forward, backward, or central difference formula. The central difference formula is preferred in most applications for its accuracy. In general, a central difference formula is one where the numerical first derivative at a time $t_i$ is computed by subtracting the sensor value at time $t_{i-1}$ from the value at time $t_{i+1}$ and dividing the result by $(t_{i+1}-t_{i-1})$. This three-point symmetric calculation results in a numerical derivative with an error on the order of $h^2$, where $h=(t_{i+1}-t_{i-1})$.

If the sampling rate of sensor readings is low, filtering the signal for smoothing should be done as part of determining the gradient. Otherwise, the large step size resulting from a low sampling rate could lead to inaccurate and fluctuating derivatives that would make determining the peak value difficult. A zero-phase digital filter is one filter that can be used to accurately determine the times that the smoothed derivatives of sensor readings reach their peaks. A zero-phase digital filter is special case of a linear phase filter in which the time shift is zero. One possible way of implementing a zero-phase filter is using forward and backward filtering. For example, the filtfilt function in Matlab can be used to perform this function by filtering a sequence in the forward direction, and then reversing the sequence and running it back through the filter. In should also be noted that in most cases, the sampling rate of the sensors would preferably be higher than 1 Hz to account for the fact that the changes in the derivatives of exhaust gas temperature and engine speed that are of interest take place within a few seconds in a typical gas turbine engine.

The next step 208 is to determine an engine speed peak gradient time in the first time interval. The engine speed peak gradient time in the first time interval is the time in the first time interval when the engine speed is increasing the fastest. Stated another way, the engine speed peak gradient time occurs at the time of highest slope in the engine speed plot during the first time interval. Again, a variety of mathematical techniques can be used to determine the time of the peak gradient for the engine speed, such as central difference formulas and zero-phase filters.

The next step 210 is to determine a second time interval between the peak gradient times. Specifically, the second time interval is the time interval between the engine speed peak gradient time and the temperature peak gradient time. The second time interval narrows the estimation from the fist time interval of when lightoff was to have occurred. Thus, the second time interval corresponds to a more accurate estimation of the time period when the engine lightoff is to have occurred.

The last step 212 is to determine an engine speed minimum gradient time in the second time interval. The engine speed minimum gradient time in the second time interval is the time in the second time interval when the engine speed is increasing the slowest. Stated another way, the engine speed minimum gradient time occurs at the time of the smallest slope in the engine speed plot during the second time interval. Again, a variety of mathematical techniques can be used to determine the time of the minimum gradient for the engine speed, such as central difference formulas and zero-phase filters.

The engine speed minimum gradient time corresponds to a more accurate estimation of when lightoff has occurred in turbine engine. Thus, the engine speed minimum gradient time determined in step 212 can be used as an accurate approximation of when lightoff has occurred. This estimation of turbine engine lightoff can be used in a variety of procedures, including trending and real time turbine engine control systems.

For example, the estimation of turbine engine lightoff produced by the system and method can be used in trending for fault detection during startup of the engines. Trending generally uses multiple sets of engine data to estimate and predict performance of the engine. For example, using data from multiple startup procedures on the turbine, trending can be used to more accurately estimate engine performance during startup, predict future performance and detect likely faults. Stated another way, trending can involve filtering the data to generate a more accurate, filtered estimate of the data. Additionally, data trending can include generating predicted likely future values for the sensor data. In all these cases, trending can be used to facilitate prognosis and fault detection in the turbine engine system.

The estimation of engine lightoff determined using the system and method can be used to improve trending during engine startup. Specifically, by providing a more accurate estimation of when engine lightoff has occurred, the system and method facilitate comparison of different measurements taken during different startups, under different ambient conditions and at different stages of engine health. Specifically, the estimated time of engine lightoff can be used as a reference time to align different measurements for trending. This can improve the accuracy of the trending and thus result in more reliable predictions of future performance.

Additionally, the estimation of engine lightoff can be used to facilitate improved data mining of turbine engine performance. Specifically, the method facilitates the comparison of engine start data not only for one engine for various ambient conditions but also from engine to engine when a fleet of vehicles are involved. Thus, a large quantity of data can be used in efficient data mining and in the creation of start algorithms.

Additionally, the estimation of engine lightoff can be used in engine control. In such a system, the estimation of engine lightoff would typically be performed in real time. In this case, the temperature and speed would be measured, and their gradients calculated in real time. As will the methods discussed above, the process would commence with the initial starting of the turbine engine that defines the start of the first time interval. After engine starting has commenced, the engine speed gradient is monitored to determine when the engine speed gradient hits a peak. The engine speed gradient peak again would correspond to the beginning of the second time interval discussed above. After the engine speed gradient peak, the engine speed gradient would continue to be monitored as it decreases until it reaches a minimum. The engine speed gradient minimum would again correspond to the estimation of when engine lightoff had occurred. Thus, an estimation of lightoff can be determined in real time.

Furthermore, the engine temperature gradient is also monitored in real time. Sometime after the engine speed gradient minimum, the engine temperature gradient would likewise peak. The engine temperature gradient peak would again correspond to the end of the second time interval discussed above, and can thus confirm that the engine speed gradient minimum detected previously does in fact correspond to a detection of engine lightoff. Thus, the system and method can be adapted to use the 3-step lightoff detection approach to detect engine lightoff in real time. It should be noted that even with the delay in lightoff detection confirmation caused by waiting for the engine temperature gradient peak, this approach can still detect lightoff up to 10 seconds earlier than the current approach of detecting lightoff based on exhaust gas temperature threshold. The results of this estimation can then be made available to the control system in real time to improve the control over the engine itself. Such a system can be useful in setting the fuel schedules to complete the startup and bring the engine to an idle speed. A timely detection system of lightoff can lead to shorter times, improved fuel burn, and longer life cycles for the start system.

A typical engine startup sequence proceeds as follows: The starter begins to rotate the engine and the igniter is switched on, causing the igniter plugs to start firing. At about 7% (0.07) of full engine speed the igniter system is turned on. Lightoff occurs when the ignition successfully completes and the combustor is able to sustain combustion. The exhaust gas temperature (EGT) rises sharply at light-off. The engine starter continues to provide rotational torque to the engine as the engine speed continues to increase. The power section then begins to provide rotational energy to the system. At about 40% engine speed, the starter system is shut off.

There are several problems that can arise during startup. For example, during the first phase of startup, until light-off has occurred, igniter system degradation can negatively impact startup and will manifest more strongly than at other times. Between 7% and 40% speed, starter faults are manifest more strongly than at other times of the startup. In the final phase, from the time the starter shuts off and the engine rotates on its own power, the effects of power section degradation are most evident. The effects of starter degradation propagate (in terms of start times) forward in time during the start cycle, but the engine power section effects dominate after the 40% speed mark (after the starter has been turned off).

Figure 3:
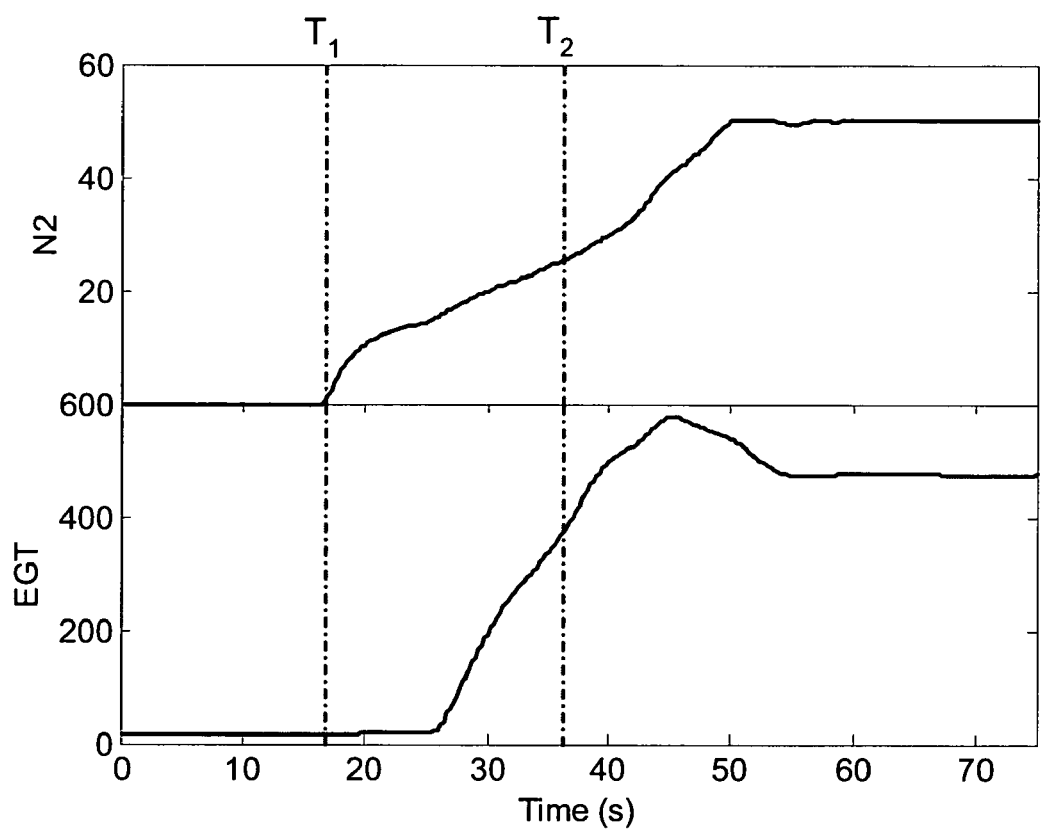
FIGS. 3, 4 and 5 are exemplary graphs of engine data during turbine engine startup.

Turning now to FIG. 3, a graph 300 illustrating exemplary temperature sensor data and engine speed sensor data during turbine engine startup is illustrated. Specifically, graph 300 illustrates engine rotational speed (N2) and exhaust gas temperature (EGT) for a turbine engine during startup.

As described above, to determine an estimate of lightoff in a turbine engine a first time interval is determined between an engine start time and a threshold temperature time. The engine start time at the beginning of the first interval can be any suitable time in the starting process. In the illustrated example, the engine start time comprises a time $T_1$, that corresponds to when the starter motor begins to turn the engine. Of course, other suitable starting reference points could also be used.

Likewise, the threshold temperature time is a time when the engine reaches a threshold temperature that indicates that lightoff has occurred. Preferably, the threshold temperature used for this time is selected to assure that lightoff has always occurred before this threshold temperature is reached. In the illustrated example, a threshold value for exhaust gas temperature (EGT) is reached at time $T_2$. Thus, at time $T_2$ it can be reasonably assumed that lightoff has occurred in the turbine engine.

The first time interval is thus defined as the time interval between time $T_1$ and time $T_2$. The first time interval is thus a first estimate of a period when lightoff can be assumed to have occurred. With the first time interval determined, the peak gradient of the temperature and speed in the first interval can be determined.

Figure 4:
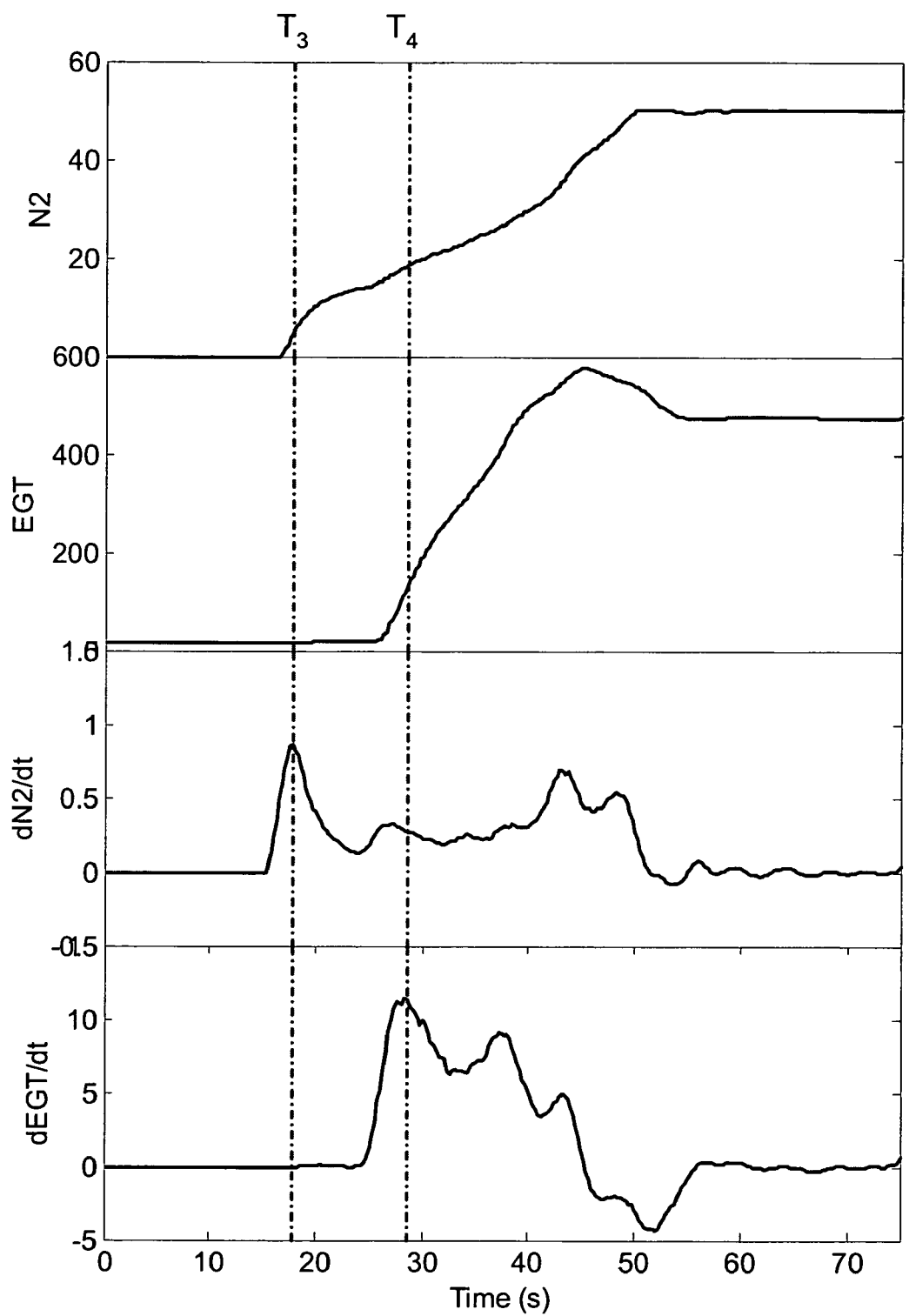

Turning now to FIG. 4, a graph 400 illustrates engine rotational speed (N2) and exhaust gas temperature (EGT) of graph 300, along with the corresponding EGT gradient (dEGT/dt) and N2 gradient (dN/dt) derived from the same data. The peak gradients of the EGT and N2 sensor data in the first time interval will be used to define a second, narrower time interval. In the illustrated example, the peak gradient of the N2 sensor data occurs at time $T_3$. Likewise, the peak gradient of the EGT sensor data occurs at time $T_4$.

Thus, the second time interval is defined as the time between time $T_3$ and $T_4$. This second interval is a more accurate estimate of when lightoff can be reasonably assumed to have occurred. With the second time interval determined, the minimum gradient of engine speed during the second time interval can be determined.

Figure 5:
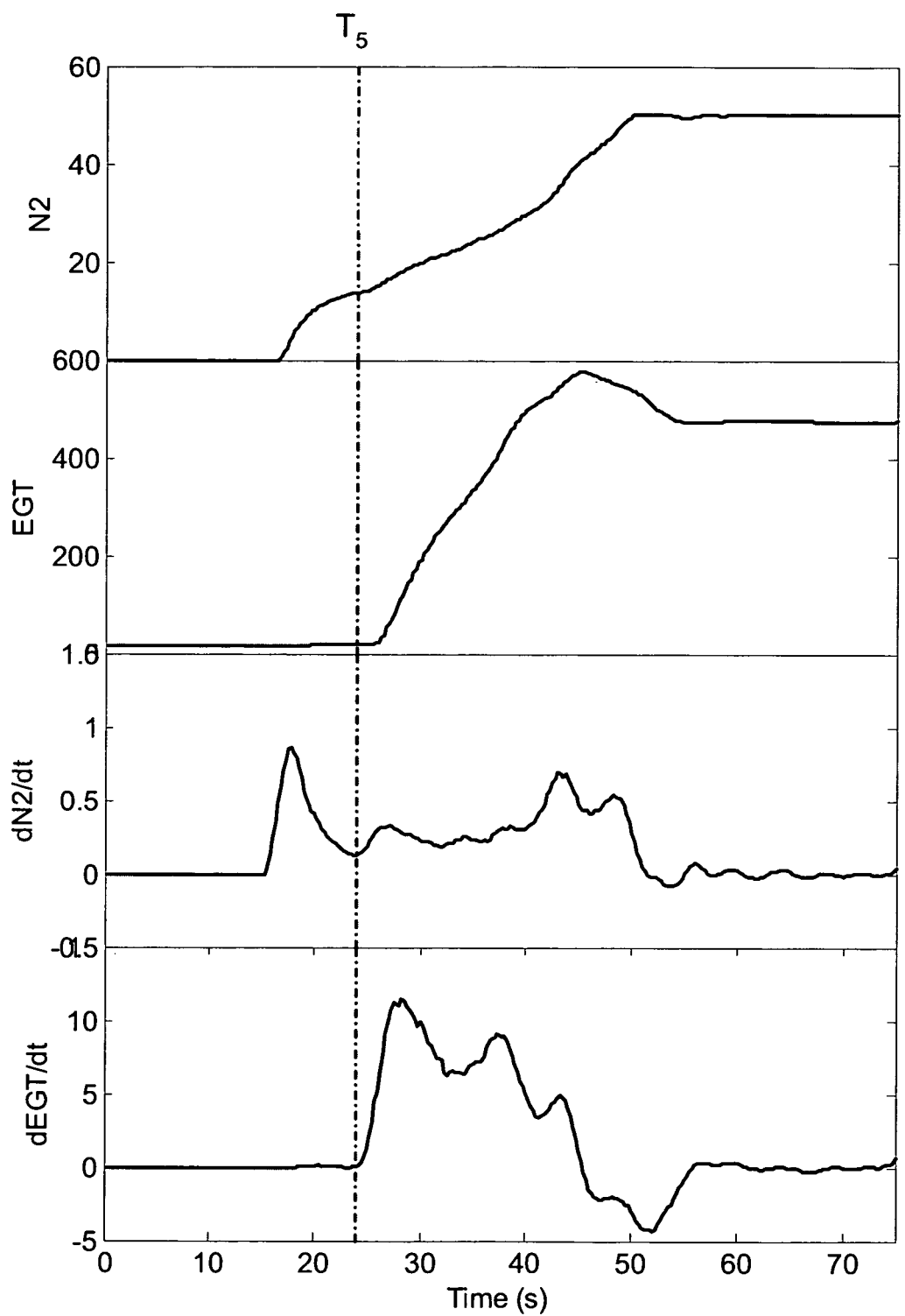

Turning now to FIG. 5, a graph 500 illustrates engine rotational speed (N2), exhaust gas temperature (EGT), corresponding EGT gradient (dEGT/dt) and N2 gradient (dN/dt) illustrated from graph 400. The minimum gradient of the engine speed N2 within the second time interval can be determined as used as an estimate of when lightoff occurred in the turbine engine. In the illustrated example, the minimum gradient of the engine speed N2 occurs at time $T_5$. Thus, time $T_5$ can be used as an estimated time of lightoff in trending and engine control applications.

Figure 6:
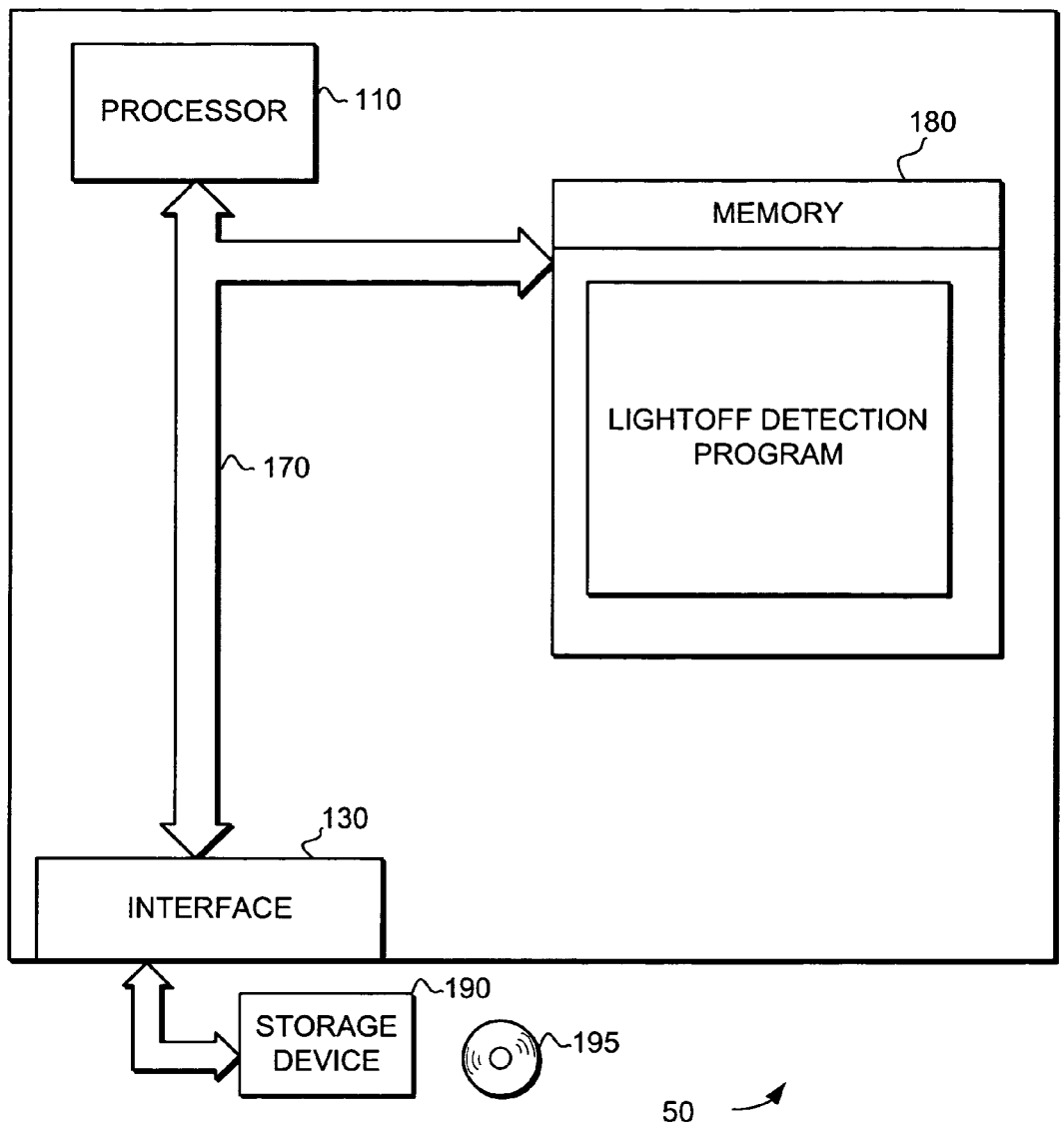
FIG. 6 is a schematic view of a computer system that includes a lightoff detection program.

The lightoff detection system and method can be implemented in wide variety of platforms. Turning now to FIG. 6, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes a lightoff detection program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 6, storage device 190 can comprise a disc drive device that uses discs 195 to store data.

In accordance with the preferred embodiments of the invention, the computer system 50 includes lightoff detection program. Specifically during operation, the lightoff detection program is stored in memory 180 and executed by processor 110. When being executed by the processor 110, lightoff detection program receives sensor data and determines an estimate of when lightoff has occurred from that sensor data. The estimate of lightoff can then be used as part of a trending system for fault detection and/or a control system for real time control of the turbine engine.

As one example implementation, the light off detection program can operate on data that is acquired from the turbine engine and periodically uploaded to an internet website. The lightoff detection analysis is performed by the web site and the results are used in trending and fault detection and returned back to the technician or other user. Thus, the system can be implemented as part of a web-based diagnostic and prognostic system.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a system and method for lightoff detection in a turbine engine that provides improved accuracy and consistency. The lightoff detection system and method uses engine temperature sensor data and engine speed sensor data. Specifically, the system and method use engine temperature and engine rotation speed sensor data acquired over time to determine a first time interval during which the lightoff is estimated to have occurred. A peak gradient in the temperature sensor data within the first time interval and a peak gradient in the engine rotation sensor data within the first time interval are then determined. The temperature peak gradient time and the engine rotation peak gradient time are then used as boundaries to determine a narrowed time interval within the first time interval. The gradient of engine rotation sensor data is then used to accurately pinpoint the lightoff time in the narrowed time interval. Specifically, the minimum gradient in the engine rotation sensor data in the narrowed time interval is determined, with the minimum gradient time in the engine rotation sensor data comprising an accurate estimate of lightoff time for the turbine engine. The lightoff detection system and method is thus able to accurately and consistently determine when lightoff has occurred in a turbine engine.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of detecting combustion system lightoff in a turbine engine, the method comprising the steps of:
   a) receiving engine temperature sensor data and engine speed sensor data for the turbine engine during startup;
   b) determining a first time interval before a threshold time when the engine temperature sensor data reaches a threshold value;
   c) determining a peak gradient of the engine temperature sensor data in the first time interval;
   d) determining a peak gradient of the engine speed sensor data in the first time interval;
   e) determining a second time interval between the peak gradient of the engine temperature sensor data and the peak gradient of the engine speed sensor data; and
   f) determining a minimum gradient time of the engine speed sensor data in the second time interval, the minimum gradient time comprising an estimated lightoff time for the turbine engine.

2. The method of claim 1 wherein the step of determining a first time interval before a threshold time comprises determining the first time interval between an initial start time of the turbine engine and the threshold time.

3. The method of claim 2 wherein the initial start time comprises a time when an engine Starter begins to operate.

4. The method of claim 1 wherein the engine temperature sensor data comprises hot section temperature data.

5. The method of claim 1 wherein the engine temperature sensor data comprises exhaust gas temperature data.

6. The method of claim 1 wherein the engine speed data comprises engine rotational speed data N.

7. The method of claim 1 wherein the engine speed data comprises engine rotational speed data N2.

8. The method of claim 1 wherein the step of determining a peak gradient of the engine temperature sensor data in the first time interval comprises computing numerical derivatives using a central difference formula.

9. The method of claim 8 wherein the step of determining a peak gradient of the engine temperature sensor data in the first time interval further comprises and smoothing the numerical derivatives using a zero phase filter.

10. The method of claim 1 wherein the step of determining a peak gradient of the engine speed sensor data in the first time interval comprises computing numerical derivatives using a central difference formula.

11. The method of claim 10 wherein the step of determining a peak gradient of the engine speed sensor data in the first time interval further comprises and smoothing the numerical derivatives using a zero phase filter.

12. The method of claim 1 wherein the step of determining a minimum gradient time of the engine speed sensor data in the second time interval comprises computing numerical derivatives using a central difference formula further comprises and smoothing the numerical derivatives using a zero phase filter.

13. A method of detecting combustion system lightoff in a turbine engine, the method comprising the steps of:
   a) receiving engine temperature sensor data and engine speed sensor data for the turbine engine during startup;
   b) deter a peak gradient of the engine speed sensor data; and
   c) determining a minimum gradient time of the engine speed sensor data after the peak gradient of the engine speed sensor data, the minimum gradient time comprising an estimated lightoff time for the turbine engine.

14. The method of claim 13 further comprising the step of determining a peak gradient of the engine temperature sensor data after the minimum gradient time of the engine speed sensor data to confirm that the lightoff has occurred.

15. The method of claim 14 wherein the engine temperature sensor data comprises exhaust gas temperature data.

16. The method of claim 13 wherein the engine speed data comprises engine rotational speed data N.

17. The method of claim 13 wherein the engine speed data comprises engine rotational speed data N2.

18. The method of claim 13 wherein the step of determining a peak gradient of the engine speed sensor data comprises computing numerical derivates using a central difference formula and smoothing the numerical derivatives using a zero phase filter.

19. The method of claim 13 wherein the step of determining a minimum gradient time of the engine speed sensor data comprises computing numerical derivatives using a central difference formula and smoothing the numerical derivatives using a zero phase filter.

20. The method of claim 13 wherein the steps are performed in real time during startup of the turbine engine.

* * * * *